(12) United States Patent
Priel et al.

(10) Patent No.: US 9,304,580 B2
(45) Date of Patent: Apr. 5, 2016

(54) ELECTRONIC CIRCUIT AND METHOD FOR STATE RETENTION POWER GATING

(75) Inventors: Michael Priel, Hertzelia (IL); Dan Kuzmin, Givat Shmuel (IL); Anton Rozen, Gedera (IL)

(73) Assignee: Freescale Semiconductor, Inc., Austin, TX (US)

( * ) Notice: Subject to any disclaimer, the term of this patent is extended or adjusted under 35 U.S.C. 154(b) by 346 days.

(21) Appl. No.: 13/812,889

(22) PCT Filed: Aug. 5, 2010

(86) PCT No.: PCT/IB2010/053554
§ 371 (c)(1),
(2), (4) Date: Jan. 29, 2013

(87) PCT Pub. No.: WO2012/017269
PCT Pub. Date: Feb. 9, 2012

(65) Prior Publication Data
US 2013/0132756 A1      May 23, 2013

(51) Int. Cl.
*G06F 1/32* (2006.01)
(52) U.S. Cl.
CPC ............ *G06F 1/3287* (2013.01); *G06F 1/3203* (2013.01); *G06F 1/3243* (2013.01); *Y02B 60/1239* (2013.01); *Y02B 60/32* (2013.01)
(58) Field of Classification Search
CPC ............................. G06F 1/3287; G06F 1/3203
See application file for complete search history.

(56) References Cited

U.S. PATENT DOCUMENTS

| 6,336,161 | B1 | 1/2002 | Watts | |
|---|---|---|---|---|
| 2003/0046600 | A1* | 3/2003 | Shimizu | G06F 1/04 |
| | | | | 713/600 |
| 2004/0088630 | A1* | 5/2004 | Arima et al. | 714/744 |
| 2007/0150780 | A1* | 6/2007 | Shimooka | 714/726 |
| 2008/0030224 | A1 | 2/2008 | Dasgupta | |
| 2008/0201592 | A1 | 8/2008 | Lawrence et al. | |
| 2008/0256551 | A1 | 10/2008 | Priel et al. | |
| 2008/0315932 | A1 | 12/2008 | Tower et al. | |

(Continued)

FOREIGN PATENT DOCUMENTS

| WO | 2008-129362 A2 | 10/2008 | |
|---|---|---|---|
| WO | WO 2008129362 A2 * | 10/2008 | ............. H03K 19/00 |

OTHER PUBLICATIONS

International Search Report and Written Opinion correlating to PCT/IB2010/053554 dated Apr. 28, 2011.

*Primary Examiner* — Thomas Lee
*Assistant Examiner* — Chad Erdman

(57) ABSTRACT

An electronic circuit includes a processor having a functional mode and a low power mode, said processor comprising state flip-flops and additional flip-flops; said state flip flips are arranged to store state information about a state of the processor when the processor is in the functional mode; said state flip-flops comprise non-reset flip-flops that are arranged to store at least one non-reset value when the processor exits the functional mode; a power management circuit for providing power to the processor when the processor is in the functional mode, and for preventing power from the processor when the processor is in the low power mode; a non-reset value identification module, coupled to the state flip-flops, said non-reset value identification module is arranged to identify the non-reset flip-flops and to generate non-reset information that identifies the non-reset flip-flops; and a recovery circuit, coupled to a memory module and to the state flip-flops.

18 Claims, 4 Drawing Sheets

(56) References Cited

U.S. PATENT DOCUMENTS

| | | | |
|---|---|---|---|
| 2010/0080158 A1* | 4/2010 | Stahl | 370/311 |
| 2010/0161303 A1* | 6/2010 | McGowan et al. | 703/13 |
| 2010/0169727 A1* | 7/2010 | Ito et al. | 714/726 |
| 2013/0132753 A1* | 5/2013 | Priel et al. | 713/323 |

* cited by examiner

ELECTRONIC CIRCUIT AND METHOD FOR STATE RETENTION POWER GATING

FIELD OF THE INVENTION

This invention relates to a method and an electronic circuit for state retention power gating.

BACKGROUND OF THE INVENTION

State retention power gating (SRPG) is an effective strategy that is widely used to help reducing power consumption of an integrated circuit while maintaining the same levels of performance and functionality.

A processor may operate in a functional mode or in a low power mode. In the functional mode, the processor performs its primary function, such as processing or storing bits. When in the low power mode the processor is shut down but state information that is indicative of a state of the processor at the end of the functional mode preceding the entry into the low power mode should be stored.

SUMMARY OF THE INVENTION

The present invention provides a method and an electronic circuit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIG.s are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
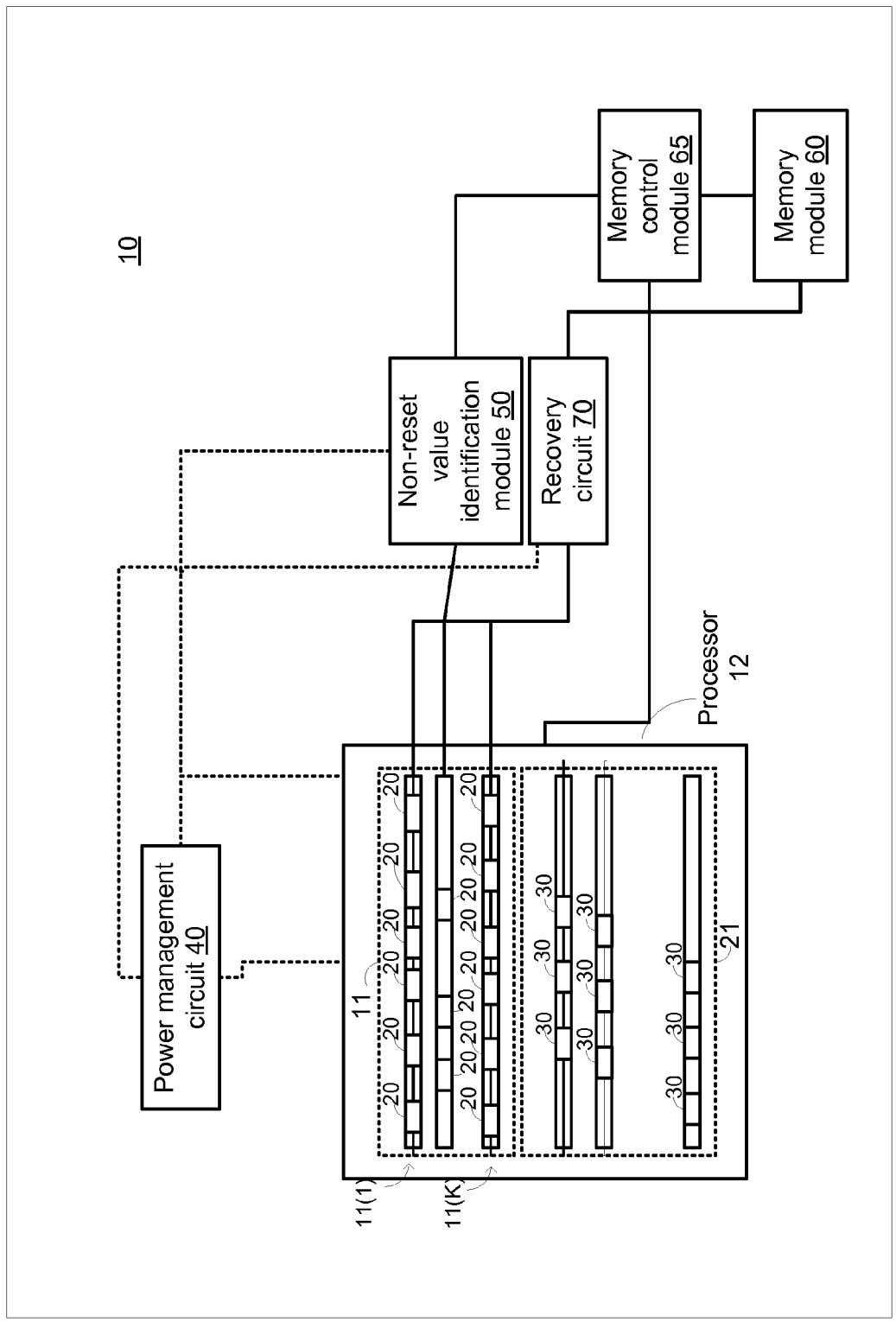
FIG. 1 schematically shows an example of an embodiment of an electronic circuit.

FIG. 1 schematically shows an example of an embodiment of an electronic circuit 10.

Electronic circuit 10 includes a processor 12, a power management circuit 40, a non-reset value identification module 50, a recovery circuit 70 and a memory module 60. The processor 12 is coupled to the power management circuit 40, the non-reset value identification module 50, to the recovery circuit 70 and the memory module 60.

The processor 12 has a functional mode and a low power mode. The processor 12 includes state flip-flops 20 and additional flip-flops 30. The state flip flips 20 are arranged to store state information about a state of the processor 12 when the processor 12 is in the functional mode. The state flip-flops 20 include non-reset flip-flops that are arranged to store at least one non-reset value when the processor 12 exits the functional mode. As shown in FIG. 1, the state flip-flops 20 are arranged in scan chains 11 such as scan chain 11(1) and 11(K). The additional flip-flops 30 are arranged in additional scan chains 21. A state scan chain 11 includes a sequence of state flip-flops 20. A state scan chain 11 can include a combination of both additional flip-flops 30 and state flip-flops 20. An additional scan chain 21 includes only additional flip-flops 30.

The power management circuit 40 is for providing power to the processor 12 when the processor 12 is in the functional mode, and for preventing power from the processor 12 when the processor 12 is in the low power mode.

The non-reset value identification module 50 is connected to the state flip-flops 20 and is arranged to identify the non-reset flip-flops and to generate non-reset information that identifies the non-reset flip-flops.

The recovery circuit 70 is connected to the memory module 60 and to the state flip-flops 20. The recovery circuit 70 is arranged to retrieve the non-reset information from the memory module 60 when the processor 12 exits the low power mode, and to provide the non-reset value only to the non-reset flip-flops that are identified by the non-reset information.

The memory module 60 is arranged to store the non-reset information when the processor 12 is in the low power mode.

Figure 2:
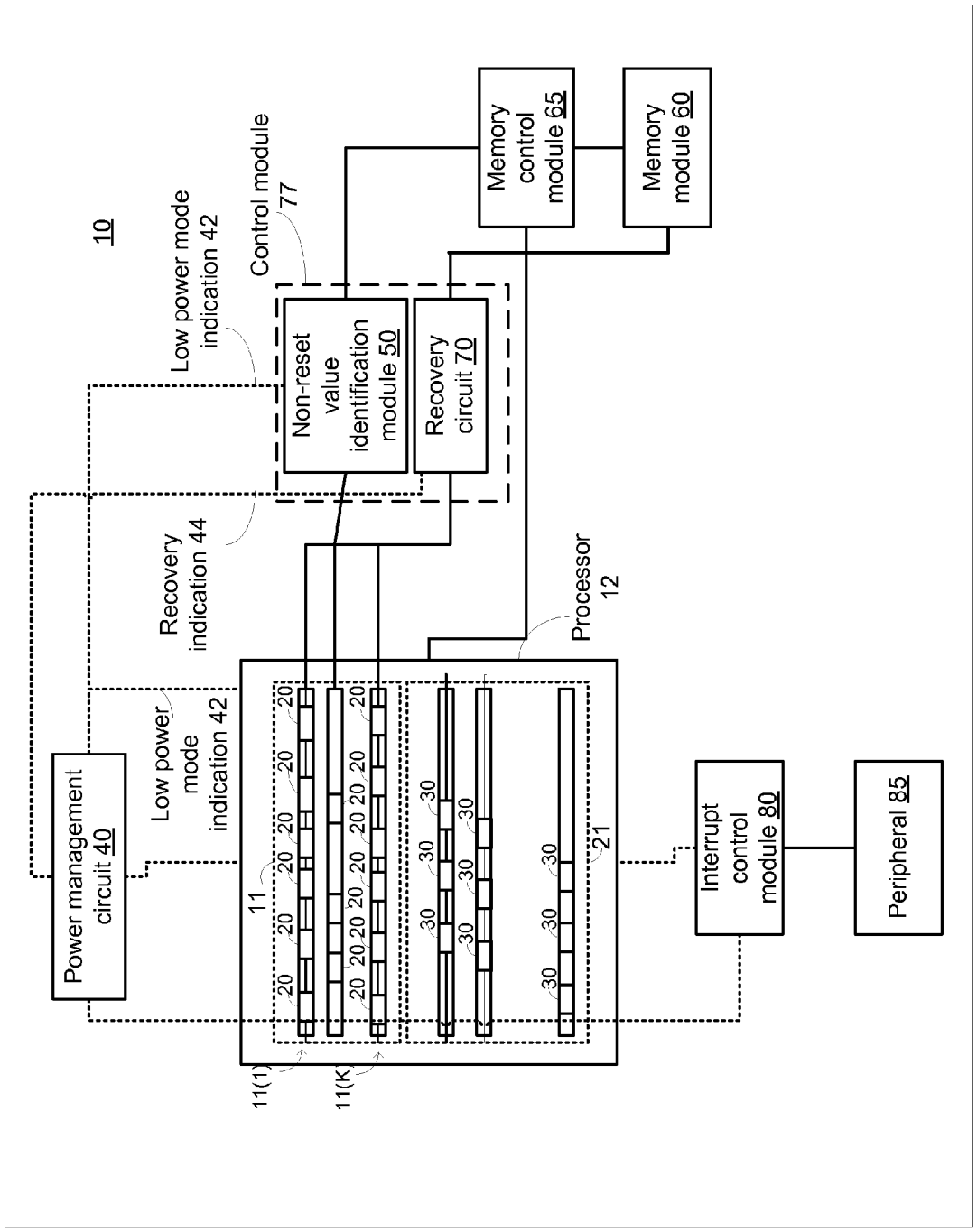
FIG. 2 schematically shows an example of an embodiment of an electronic circuit.

FIG. 2 schematically shows an example of an embodiment of an electronic circuit 10.

The electronic circuit 10 of FIG. 2 further includes an interrupt control module 80, a memory control module 65 and a peripheral 85. The non-reset value identification module 50 and the recovery circuit 70 are illustrated as being included in a control module 77.

The memory module 60 can be a cache memory module.

The processor 12 may change its operational mode from the functional mode to the low power mode (a) under the control of software that is executed by the processor 12, (b) under the control of the power management circuit 40 or (c) under the control of another component of the electronic circuit 10.

When in the functional mode the processor 12 processes information. The processor 12 may change its operational mode from the low power mode to the functional mode or vice verse in any manner suitable for the specific implementation, e.g. (a} under the control of the interrupt control module 80, (b) under the control of the power management circuit 40 or (c) under the control of another component of the electronic circuit 10. As explained below in more detail, the control module 77 determines the state of the processor 12 by examining the values of the state flip-flops 20 only. For example, the shown electronic circuit 10 includes an interrupt controlling module 80 which in connection to a peripheral 85 and the processor 12 may trigger a change in the operational mode of the processor 12. The interrupt controlling module 80 can receive an interrupt request from the peripheral 85 and interrupt the processor 12 to let the processor 12 handle the request.

The interrupt control module 80 may receive a request (from a component such as the peripheral 85) to power up the processor 12 and in return either cause the processor 12 to exit the low power mode or signal the power management circuit 40 to cause the processor 12 to exit the low power mode.

In the example, the power management circuit 40 enables power provision to the processor 12 when the processor 12 is in the functional mode and prevents processor 12 from receiving power when the processor 12 is in the low power mode—by disconnecting from processor 12, or by shutting down a supply source.

The power management circuit 40 can receive a low power mode trigger from the processor 12 (or from another circuit of electronic circuit 10, e.g. from the interrupt controlling module 80) and in response send a low power mode indication 42 to the non-reset value identification module 50, and disable the power supply to the processor 12 when the state of the processor 12 has been changed.

Before the processor 12 enters the low power mode the state of the processor 12 is stored. The state of the processor may be represented by non-reset information that will be discussed in further details herein below. The non-reset information can be stored at the memory module 60 while the processor 12 is in the low power mode.

When the processor 12 exits the low power mode the non-reset information is retrieved from the memory module 60. The non-reset information is used to reconstruct the state of the processor 12.

When the processor 12 exits the low power mode the state of the processor 12 may be reconstructed. When in the functional mode the state of the processor 12 is stored in the state flip-flops 20 of the processor 12. The state flip-flops 20 store state information that is essential for recovering the processor 12 from the low power mode. The processor 12 also includes additional flip-flops 30. The additional flip-flops 30 may store data or information that is not essential for recovering the processor 12 from the low power mode. The flip-flops may have been classified as state flip-flops 20 and additional flip-flops 30 during, for example, the design of the electronic circuit 10. The number of the state flip-flops 20 can be less than a half and even less than one fifth of a number of the additional flip-flops 30. The classification of state flip-flops to non-reset flip flops is performed whenever the processor 12 exits the functional mode.

The state of the processor 12 may be represented by non-reset information that identifies non-reset flip-flops that are state flip-flops that store a non-reset value at the point of time when the processor 12 exits the functional mode. The state of reset flip-flops (which store a reset value at the point in time when the processor 12 exits the functional mode) does not need to be stored.

The processor state may be restored by allowing state flip-flops that stored reset values to converge to their reset state and causing state flip-flops that stored non-reset values to stores these non-reset values. When the processor 12 exits the low power mode the additional flip-flops 30 are allowed to converge to their reset state.

The non-reset information usually only identifies a fraction of the flip-flops of the processor 12. In many cases this fraction is less then 50%, 33%, 20%, 13.3%, 10% or even less than 5% of the flip-flops of the processor 12.

The memory space to be allocated for storing the non-reset information is therefore much smaller than the memory space that would have to be allocated to store the entire content of all of the flip-flops of the processor 12. Thus, smaller and less power consuming memory modules 60 can be used to store the state of the processor 12.

To determine the state of the processor 12, and hence to store the state, the control module 77 only has to evaluate the values stored only in the state flip-flops 20 and can ignore values stored in the additional flip-flops 30. This can be implemented by connecting the control module 77 only to the state scan chains 11, as shown in FIG. 2. The state scan chains 11 are scan chains that include at least one state flip-flop 20. The additional scan chains 21 of the processor 12 are not connected to the control module 77.

A state scan chain 11 that includes one or more additional flip-flops 30 may be read by the control module 77 but the non-reset value identification module 50 can ignore values stored in these one or more additional flip-flops 30 of that state scan chain 11.

In the example, the power management circuit 40 can receive, from the interrupt control module 80, a request to activate the processor 12. In response to the request, the power management circuit 40 can resume the supply of power to the processor 12 and send a recovery indication 44 to the recovery circuit 70.

The non-reset value identification module 50 and the recovery circuit 70 may be implemented in any manner suitable for the specific implementation. In the shown example, the non-reset value identification module 50 is connected to the state flip-flops 20 and is arranged to (a) identify, in response to the low power indication 42, non-reset flip-flops, and (b) generate non-reset information that identifies the non-reset flip-flops.

As shown in FIG. 2, the non-reset identification module 50 is connected to multiple state scan chains 11. Even if a state scan chain includes a single non-reset flip-flop that single non-reset flip-flop is identified by the non-reset information. A state scan chain that includes one or more non-reset flip-flops is referred to as a non-reset scan chain. In the example in FIG. 2 the non-reset value identification module 50 and the state scan chain 11 are illustrated as being separated from each other. However, the non-reset value identification module 50 can be integrated in the state scan chain 11.

The non-reset information may identify the non-reset flip-flops in any manner suitable for the specific implementation. For example—the non-reset information may include a non-reset scan chain identification module for each non-reset scan chain and may also include additional non-reset information that identifies the locations of the non-reset flip-flops within these non-reset scan chains. Yet for another example—the additional non-reset information may include the entire content of each non-reset scan chain. The non-reset information may explicitly or implicitly represent the non-reset values stored in the non-reset flip-flops. Merely indentifying the non-reset flip-flops may suffice as the electrical device 10 also stores the reset values of the state flip-flops 20.

The non-reset value identification module 50 and the recovery circuit 70 can be connected to the memory module 60, either directly or indirectly. FIG. 2 illustrates the non-reset value identification module 50 and the recovery circuit 70 as being connected to the memory module 60 via a memory control module 65. The memory control module 65 controls the transfer of the non-reset information to the memory module 60 and controls the transfer of the non-reset information from the memory module 60.

The recovery circuit 70 is also connected to the state flip-flops 20. The recovery circuit 70 is arranged to: (i) retrieve the non-reset information from the memory module 60, in response to the recovery indication 44, (ii) reconstruct the state information of the processor 12 based on the non-reset information, and (iii) provide a non-reset value only to each non-reset flip-flop identified by the non-reset information.

If the state information includes non-reset values the recovery circuit 70 supplies these non-reset values to the non-reset flip-flops via state scan chains 11.

The recovery circuit 70 is not connected to the additional scan chains 21 and does not control or cause the additional flip-flops 30 to converge to non-reset states. In the shown example, the recovery circuit 70 does not control the state of the additional flip-flops 30 at all. Thus, non-reset values are not provide to the additional flip-flops 30 of the additional scan chains 21 and these additional flip-flops 30 are allowed to converge to their reset state by default.

A smaller memory space may be allocated for storing the non-reset information if the non-reset information identifies fewer non-reset scan chains. Although the number of the non-reset scan chains is not fixed, the probability of having less non-reset scan chains can be increased if during the design process of the electrical circuit the state flip-flops are grouped to state chain scans based on a probability of the state flip-flops to be in a non-reset state. The probability of a state flip-flop 20 to be in a non-reset state can be evaluated by estimating the values stored in the state flip-flop 20 just before the processor 12 enters a low power mode-when the processor 12 executes software. A state flip-flop 20 that will store in most cases a non-reset value can be regarded as having a high probability of being a non-reset flip-flop.

Figure 3:
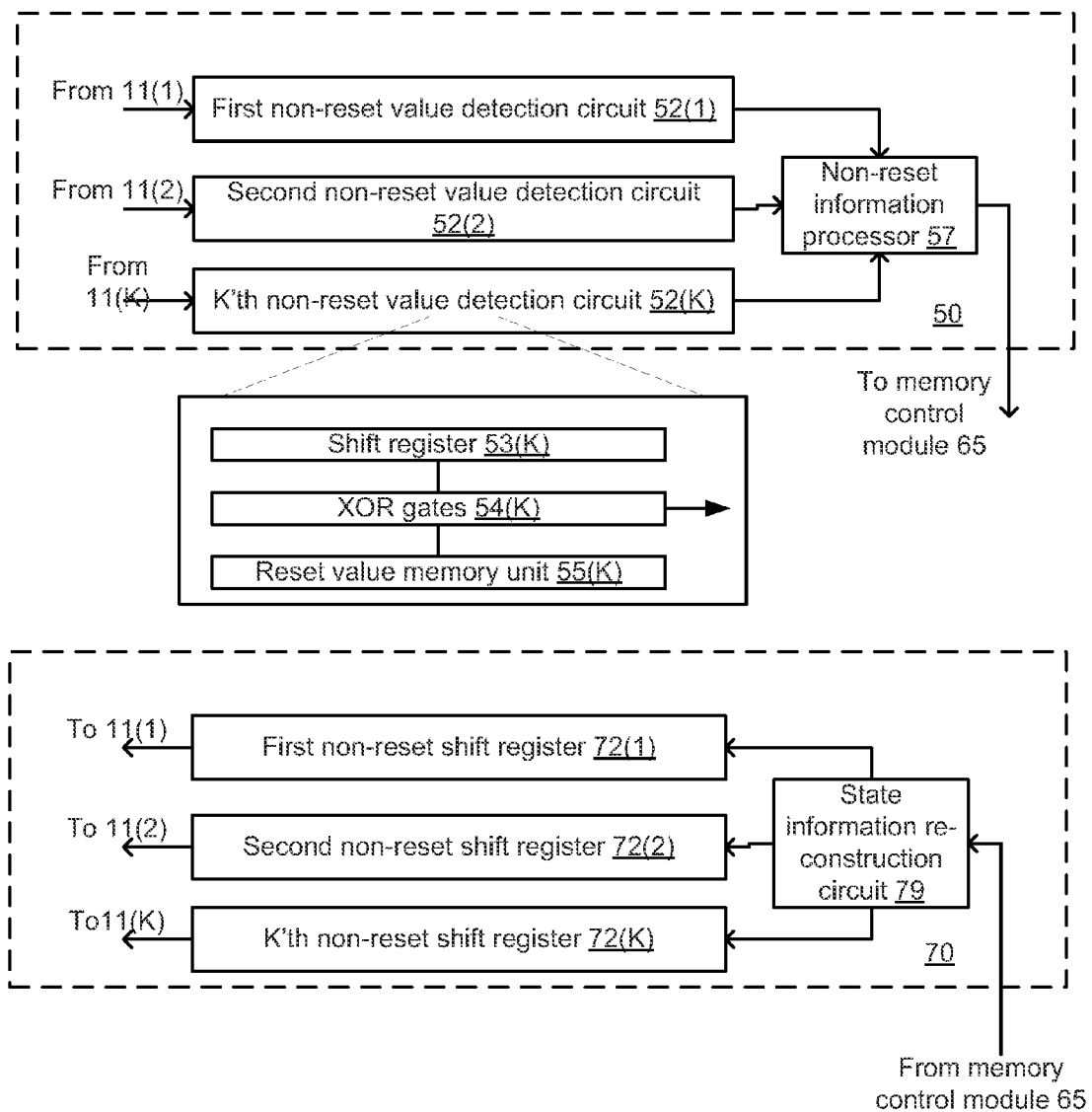
FIG. 3 schematically shows an example of an embodiment of a non-reset value identification module and of a recovery circuit of the electronic circuit of FIG. 1 and of FIG. 2.

FIG. 3 schematically shows an example of an embodiment of a non-reset value identification module 50 and of a recovery circuit 70.

The non-reset value identification module 50 can include K non-reset value detection circuits 52(1)-52(K). In the example, each non-reset value detection circuit is connected to a single state scan chain of the K state scan chains 11(1)-11(K) and when it appreciates that the content of a single state scan chain to non-reset values of the state flip-flops that belong to the single scan chain and provides comparison results that identify non-reset flip-flops. Each non-reset value detection circuit may include a shift register for receiving the content of the state scan chain, and multiple comparators that compare the reset value of each of the state flip-flops of that state scan chain to the currently stored values.

As shown in FIG. 3, the K'th non-reset value detection circuit 52(K) includes a shift register 53(K) that receives as input the content of the K'th state scan chain 11(K). The shift register 53(K) is connected to the XOR gates 54(K). The XOR gates 54(K) are also connected to the K'th reset value memory unit 55(K). The K'th reset value memory unit 55(K) stores the reset values of the state flip-flop of the K'th state scan chain 11(K). The XOR gates 54(K) perform a XOR operation between the content of the K'th state scan chain (11(K)) and the reset values of these state flip-flops to provide comparison results.

The K non-reset value detection circuits 52(1)-52(K) are connected to a non-reset information processor 57. The non-reset information processor 57 generates non-reset information based on the comparison results. For example, the comparison results may form the non-reset information. Comparison results that relate to a state scan chain can include a sequence of non-reset information bits, each bit indicates whether a certain state flip-flop of the state scan chain stores a reset value or a non-reset value. This sequence of non-reset information bits can form the non-reset information. Yet for another example, the non-reset information may include only comparison results of non-reset scan chains. Thus, only if one or more state flip-flop of a certain state scan chain stores a non-reset value then the non-reset information will reflect the context of that certain state scan chain. Yet for a further example, the comparison results may be encrypted, decoded or otherwise processed to provide the non-reset information.

As shown in FIG. 3, the recovery circuit 70 includes a state information re-construction circuit 79 that receives the non-reset information from the memory control module 65 and reconstructs the state information that was stored in the state flip-flops or at least restores the information that was stored in the non-reset scan chains.

The state information re-construction circuit 79 may reverse the operation of the non-reset information processor 57. The state information re-construction circuit 79 is connected to K non-reset shift registers 72(1)-72(K), each connected to a state scan chain. The content of each non-reset scan chain is fed, from the corresponding non-reset shift register to that non-reset chain scan.

Referring to the example of FIG. 2, the power management circuit 40 can send to the non-reset value identification module 50 and to the recovery circuit 70, at least one control signal (such as low power mode indication 42 and recovery indication 44) indicating whether the processor 12 should exit a functional mode or exit a state retention mode.

When the at least one control signal indicates that the processor 12 should exit the functional mode, the following may occur: (i) the non-reset value identification module 50 can identify, in response to a receiving of the at least one control signal, non-reset flip-flops; (ii) the non-reset value identification module 50 generates non-reset information that identifies the non-reset flip-flops; (iii) the memory module 60 stores the non-reset information; and (iv) the power management circuit 40 stops a supply of power to the processor 12.

When the at least one control signal indicates that the processor 12 should exit the low power mode, the following may occur: (i) the power management circuit 40 provides power to the processor 12; (ii) the recovery circuit 70 retrieves, in response to a receiving of the control signal, the non-reset information from the memory module 60; (iii) the recovery circuit 70 provides the non-reset value only to non-reset flip-flops that are identified by the non-reset information; (iv) the recovery circuit 70 allows flip-flops that differ from the non-reset flip-flops to converge to a reset state; and (iv) the processor 12 operates in the functional mode.

Figure 4:
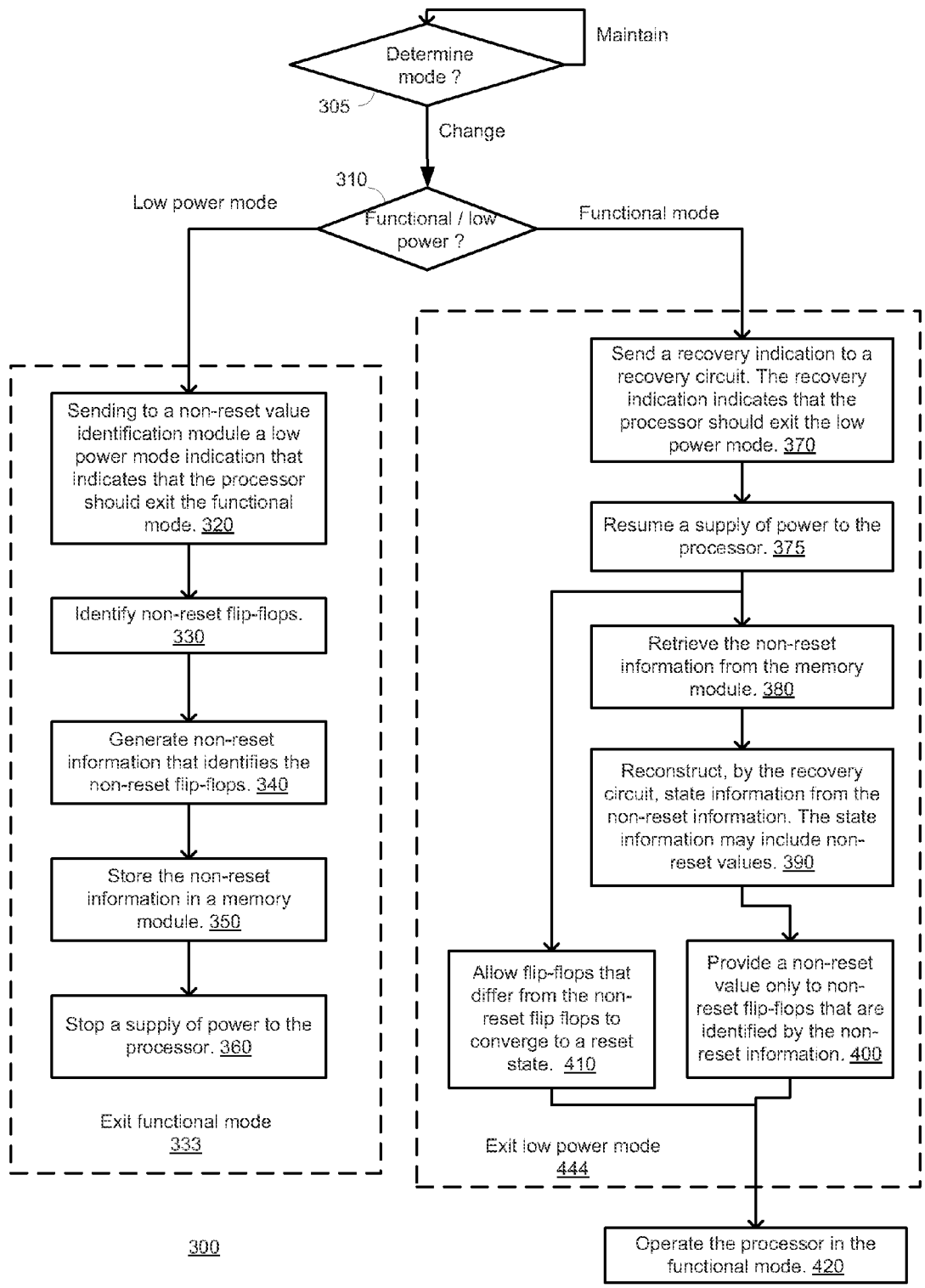
FIG. 4 schematically shows a flow chart of an example of a method for state retention power gating.

FIG. 4 schematically shows a flow chart of an example of a method 300 for state retention power gating.

Method 300 can be executed by the electrical circuit 10 of FIG. 1 or of FIG. 2.

Method 300 starts by determining (box 305) the operational mode of the processor—and especially determining whether to maintain the processor in its current operational mode or to change it.

If determining to change the operational mode of the processor then the determining (box 305) is followed by (box 310) of determining whether to (i) enter a low power mode and execute an "exit functional mode" sequence 333 (boxes 320-360), or (ii) enter a functional mode and execute "exit low power mode" sequence 444 (boxes 370-410).

The determining (boxes 305 and 310) may be repeated while processor 12 operates in its current operational mode.

The "exit functional mode" sequence 333 starts by (box 320) sending to a non-reset value identification module a low power mode indication that indicates that the processor should exit the functional mode. In response to the identification (box 330), non-reset flip-flops are identified, by the non-reset value identification module, and (box 340), non-reset information is generated that identifies the non-reset flip-flops.

The state flip-flops can be coupled to the non-reset value identification module via multiple scan chains and the generation of the non-reset information (box 340) may include generating, by the non-reset value identification module, non-reset information about values stored in each scan chain that includes at least one non-reset flip-flop. Additionally or alternatively, the generation of the non-reset information may include generating, by the non-reset value identification module, non-reset information about locations of the at least one non-reset flip-flop.

The generation of the non-reset information is followed by (box 350) the non-reset information is stored in a memory module. When the non-reset information is stored (box 360) the supply of power to the processor is stopped. The processor 12 is then in the low power mode.

The "exit low power mode" sequence 444 starts by (box 370), sending a recovery indication to a recovery circuit. The recovery indication indicates that the processor should exit the low power mode.

In response to the recovery indication (box 375), a supply of power to the processor is resumed.

Once the power supply is resumed, (i) the non-reset information is retrieved from the memory module (box 380) by the recovery circuit, and (ii) flip-flops that differ from the non-reset flip-flops are allowed (box 410), to converge to a reset state. This conversion (box 410) may include preventing non-reset values to be fed to the additional flip-flops.

The retrieval of the non-reset information is followed by (box 390) a reconstruction of state information from the non-reset information. The state information may include non-reset values to be provided to non-reset flip-flops. In response to the non-reset information, only non-reset flip-flops that are identified by the non-reset information are provided (box 400), with non-reset values. Each non-reset flip-flop receives its own non-reset value. Different non-reset flip-flops may have the same non-reset value but may differ from each other by their non-reset value.

Once the "exit low power mode" sequence 444 is completed, the processor (box 420), is allows to operate in the functional mode.

In the foregoing specification, the invention has been described with reference to specific examples of embodiments of the invention. It will, however, be evident that various modifications and changes may be made therein without departing from the broader spirit and scope of the invention as set forth in the appended claims. For example, the power management circuit may belong to the same integrated circuit as the processor or may belong to another integrated circuit.

Furthermore, each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

In the claims, the word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. An electronic circuit, comprising:
   a processor having a functional mode and a low power mode, said processor comprising state flip-flops and additional flip-flops; said state flip flips are arranged to store state information about a state of the processor when the processor is in the functional mode; said state flip-flops comprise non-reset flip-flops that are arranged to store at least one non-reset value when the processor exits the functional mode, wherein the state flip-flops are arranged in scan chains;
   a power management circuit for providing power to the processor when the processor is in the functional mode, and for preventing power to the processor when the processor is in the low power mode;
   a non-reset value identification module, coupled to the state flip-flops, said non-reset value identification module is arranged to determine that a scan chain is a non-reset scan chain in response to the scan chain including a non-reset flip-flop, to generate non-reset information that identifies the non-reset flip-flops, and to generate additional non-reset information including a value of each flip-flop in the scan chain in response to determining that the scan chain is a non-reset scan chain; and
   a recovery circuit, coupled to a memory module and to the state flip-flops, said recovery circuit is arranged to retrieve the non-reset information from the memory module when the processor exits the low power mode, and to provide the non-reset value only to the non-reset flip-flops that are identified by the non-reset information; and
   wherein said memory module is arranged to store the non-reset information when the processor is in the low power mode.

2. The electronic circuit according to claim 1, wherein the non-reset value identification module is arranged to generate non-reset information about locations of the non-reset flip-flops.

3. The electronic circuit according to claim 1, wherein the processor further comprises additional scan chains; wherein a number of the multiple scan chains is a fraction of the additional chain scans.

4. The electronic circuit according to claim 1, wherein a number of the state flip-flops is less than a half of a number of the additional flip-flops.

5. The electronic circuit according to claim 1, wherein a number of the state flip-flops is less than one fifth of a number of the additional flip-flops.

6. The electronic circuit according to claim 1, wherein the state flip-flops are grouped to scan chains based on a probability of the state flip-flops to be in a non-reset state.

7. A method for storing a state of a processor, the method comprising:
sending to a non-reset value identification module and to a recovery circuit, at least one control signal indicating whether a processor should exit a functional mode or exit a state retention mode; wherein said processor comprises state flip-flops and additional flip-flops;
when said at least one control signal indicates that the processor should exit the functional mode:
identifying, in response to a receiving of the at least one control signal by the non-reset value identification module, non-reset flip-flops; wherein each non-reset flip-flop is a state flip-flop that stores a non-reset value when the processor exits the functional mode;
generating non-reset information that identifies the non-reset flip-flops;
storing the non-reset information in a memory module;
determining that a scan chain is a non-reset scan chain in response to the scan, chain including a non-reset flip-flop;
generating additional non-reset information that identifies a value of each flip-flop in the scan chain in response to determining that the scan chain is a non-reset scan chain;
storing the additional non-reset information in the memory module; and
stopping a supply of power to the processor;
when said at least one control signal indicates that the processor should exit the low power mode:
providing power to the processor;
retrieving, in response to a receiving of the control signal by the recovery circuit, the non-reset information from the memory module;
providing the non-reset value only to non-reset flip-flops that are identified by the non-reset information;
allowing flip-flops that differ from the non-reset flip-flops to converge to a reset state; and
operating the processor in the functional mode.

8. The method according to claim 7, wherein the method comprises generating, by the non-reset value identification module, non-reset information about locations of the non-reset flip-flops.

9. The method according to claim 7, wherein the multiple scan chains are a fraction of chain scans included in the processor.

10. The method according to claim 7, wherein a number of the state flip-flops is less than a half of a number of the additional flip-flops.

11. The method according to claim 7, wherein a number of the state flip-flops is less than one fifth of a number of the additional flip-flops.

12. The method according to claim 7, wherein the state flip-flops are grouped to scan chains based on a probability of the state flip-flops to be in a non-reset state.

13. A method for storing a state of a processor, the method comprising:
sending to a non-reset value identification module and to a recovery circuit, at least one control signal indicating whether a processor should exit a functional mode or exit a state retention mode; wherein said processor comprises state flip-flops and additional flip-flops; and
when said at least one control signal indicates that the processor should exit the functional mode:
identifying, in response to a receiving of the at least one control signal by the non-reset value identification module, non-reset flip-flops; wherein each non-reset flip-flop is a state flip-flop that stores a non-reset value when the processor exits the functional mode;
generating non-reset information that identifies the non-reset flip-flops;
storing the non-reset information in a memory module;
determining that a scan chain is a non-reset scan chain in response to the scan, chain including a non-reset flip-flop;
generating additional non-reset information that identifies a value of each flip-flop in the scan chain in response to determining that the scan chain is a non-reset scan chain;
storing the additional non-reset information in the memory module; and
stopping a supply of power to the processor.

14. The method of claim 13, further comprising:
generating, by the non-reset value identification module, non-reset information about locations of the non-reset flip-flops.

15. The method of claim 13, wherein the multiple scan chains are a fraction of chain scans included in the processor.

16. The method of claim 13, wherein a number of the state flip-flops is less than a half of a number of the additional flip-flops.

17. The method of claim 13, wherein a number of the state flip-flops is less than one fifth of a number of the additional flip-flops.

18. The method of claim 13, wherein the state flip-flops are grouped to chain scans based on a probability of the state flip-flops to be in a non-reset state.

* * * * *